United States Patent [19]

Miyakawa et al.

[11] Patent Number: 4,984,839
[45] Date of Patent: Jan. 15, 1991

[54] FRONT GLASS MOULDING FOR VEHICLE

[75] Inventors: Naohisa Miyakawa; Katuhisa Kato, both of Kawarashi, Japan

[73] Assignee: Tokiwa Chemical Industries Co., Ltd., Chiba, Japan

[21] Appl. No.: 204,525

[22] Filed: Jun. 9, 1988

[51] Int. Cl.$^5$ .............................................. B60R 13/06
[52] U.S. Cl. ................................... 296/93; 296/96.21; 296/208; 52/400
[58] Field of Search ............... 296/93, 96.21, 201, 296/208, 213; 52/208, 397, 400

[56] References Cited

U.S. PATENT DOCUMENTS

| | | | |
|---|---|---|---|
| 2,205,538 | 6/1940 | Owen | 52/397 |
| 3,583,757 | 6/1971 | Wilfert | 296/201 |
| 4,088,366 | 5/1978 | Gallitzendorfer et al. | 296/154 |
| 4,349,994 | 9/1982 | Maekawa | 52/400 X |
| 4,358,917 | 11/1982 | Oda et al. | 52/400 X |
| 4,441,775 | 4/1984 | Endo et al. | 296/93 |
| 4,523,783 | 6/1985 | Yamada | 296/93 |
| 4,627,145 | 12/1986 | Niemanns | 52/400 X |
| 4,712,826 | 12/1987 | Omori | 296/93 |
| 4,757,659 | 7/1988 | Miyakawa et al. | 52/400 |
| 4,757,660 | 7/1988 | Miyakawa et al. | 52/400 |
| 4,765,673 | 8/1988 | Frabotta et al. | 296/93 |
| 4,787,187 | 11/1988 | Feldmann | 52/387 |
| 4,805,363 | 2/1989 | Gold | 52/208 |

FOREIGN PATENT DOCUMENTS

| | | |
|---|---|---|
| 0117816 | 9/1984 | European Pat. Off. ............ 296/201 |
| 0157281 | 10/1985 | European Pat. Off. . |
| 3210106 | 10/1983 | Fed. Rep. of Germany ...... 296/208 |
| 572214 | 4/1959 | Italy ....................................... 296/93 |
| 57-44088 | 3/1982 | Japan . |
| 59-12714 | 1/1984 | Japan . |
| 60-1002 | 1/1985 | Japan . |
| 60-146716 | 8/1985 | Japan . |
| 0012423 | 1/1986 | Japan ..................................... 296/93 |
| 703873 | 2/1954 | United Kingdom ................. 52/397 |

Primary Examiner—Dennis H. Pedder
Attorney, Agent, or Firm—Wenderoth, Lind & Ponack

[57] ABSTRACT

A front glass moulding for a vehicle comprises a U-shaped synthetic resin main moulding portion having a head and a leg extending downwardly from the head, and includes a central section for receiving a front glass pane and two side sections for receiving the front glass pane and guiding rainwater. Synthetic resin auxiliary moulding portions are received in the legs of the side sections for guiding rainwater.

11 Claims, 6 Drawing Sheets

FRONT GLASS MOULDING FOR VEHICLE

BACKGROUND OF THE INVENTION

This invention relates to a front glass moulding for use in a vehicle such as an automobile between the body panel and the front glass pane in the front portion of the vehicle, and more particularly to such a front glass moulding which comprises an integrally moulded body which includes a substantially U-shaped main moulding portion having a central section for receiving a glass pane and two side sections extending at substantially right angles to the central section for receiving the glass pane and guiding rainwater. Auxiliary moulding portions are adapted to be received in the side sections of the main moulding portion to form rainwater guides in cooperation with the side sections.

There have been proposed and practically employed a variety of front glass mouldings for vehicles. The prior art front glass mouldings generally comprise a central section having a groove for receiving the leading edge of a front glass pane and side sections formed separately from the central sections and having lower grooves for receiving the side edges of the glass pane and upper grooves for guiding rainwater to prevent rainwater from scattering and invading into the cab of the vehicle. However, in the prior art front glass moulding, the side sections having the upper and lower grooves cannot be employed with a central section having a single groove, since the central section and side sections have to be connected together by means of separate corner joints. Thus, the prior art front glass mouldings are formed by three different types of components. Further, the use of the corner joints degrades the external appearance of the front portion of the vehicle.

SUMMARY OF THE INVENTION

We have found that if the moulding central and side sections are formed of one type of component, the glass pane can be easily and positively held in position in the front glass moulding to thereby enhance the operation manufacturing the front glass moulding and mounting the front glass pane. Further, the elimination of the corner joints gives an aesthetic external appearance to the front portion of the vehicle.

According to the present invention, there is provided a front glass moulding for a vehicle comprising a substantially U-shaped synthetic resin main moulding portion having a wide head and a leg extending downwardly from the head at substantially right angles thereto. Included is a central section for receiving a front glass pane and side sections extending from the opposite ends of the central section at substantially right angles to the central section for receiving the glass pane and guiding rainwater. Synthetic resin auxiliary moulding portions are received in the side sections of the main moulding portion, wherein the head in the central section defines a recess for receiving the front glass pane, the legs of the side sections are each provided with on one surface at least one engaging means to pinch the front glass pane in cooperation with the associated auxiliary moulding portion, and the auxiliary moulding portions are each inwardly curved on their inner surface to form a rainwater guiding groove.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the invention in any way.

Throughout the various drawings, the identical or similar parts are assigned the same numerals thereto.

DETAILED DESCRIPTION OF THE PREFERRED EMBODIMENTS

Figure 1:
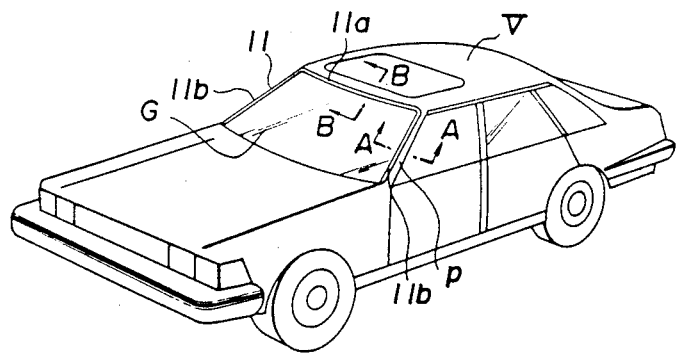
FIG. 1 is a perspective view of a vehicle on which a front glass moulding of the present invention is mounted.
Figure 2:
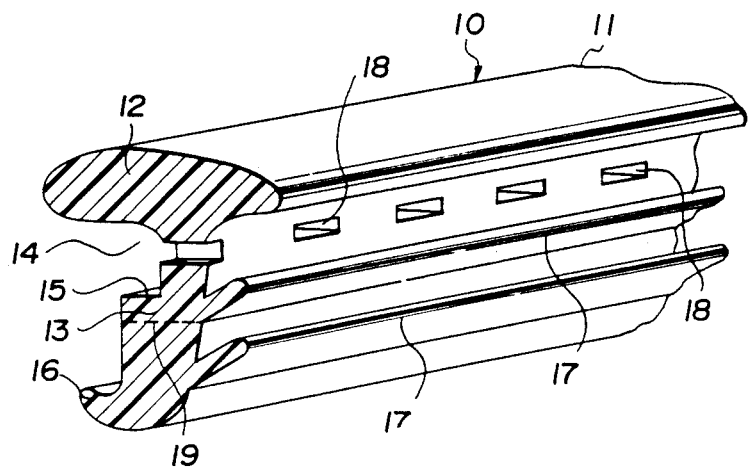
FIG. 2 is a fragmentary perspective view of a preform for a main moulding portion of a first embodiment of the front glass moulding according to the present invention.

The present invention will now be described referring to the accompanying drawings and, more particularly, to FIGS. 2 to 5 inclusive wherein a first embodiment of a front glass moulding of the present invention is illustrated. In FIG. 2, a section of a preform for the first embodiment of the front glass moulding of the present invention is generally shown by reference numeral 10 and comprises a body 11 integrally moulded by extruding a suitable synthetic resin. The body 11 is in the form of an elongated strip of a selected length and has a wide head 12, which is adapted to be exposed, and a leg 13 extending downwardly from the head at substantially right angles thereto, which is adapted to be positioned within a panel P of a vehicle V. One, or the inner, surface of the leg 13 is provided with a recess 14 in a position right below the under surface of the head 12 to define a shoulder or engaging means 15. The lower end of the leg 13 is inwardly bent in a curve to provide a projection or lower engaging means 16. The other, or outer, surface of the leg 13 is provided with at least one retention projection 17 (two vertically spaced projections 17 are in the illustrated embodiment). A plurality of through holes 18 extend across the width of the leg 13 between the head 12 and the upper projection 17. The through holes are arranged in a spaced relationship in the longitudinal direction of the body 11. The body 11 is bent into a substantially U-shaped configuration under heating to provide a central section 11a and two side sections 11b extending from the opposite ends of the central section 11a at substantially right angles thereto. The leg 13 in the central section 11a is cut along a cutting line 19 to remove the portion of the leg 13 positioned below the engaging means 15 from the leg 13 in the central section 11a, in order to provide the main moulding portion of the front glass moulding. According to the present invention, the body 11 may be formed without the portion of the leg 13 in the central section 11a that corresponds to the portion positioned below the engaging means 15 on the leg 13 in the central section 11a within the scope of the present invention. It is also contemplated that the portion of the leg 13 positioned below the engaging means 15 on the leg 13 in the section of the body where the central section 11a is expected to be formed is cut away prior to the bending of the body 11.

Figure 3:
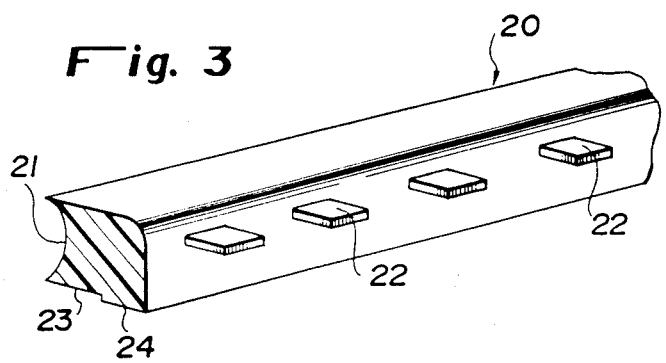
FIG. 3 is a perspective view of an auxiliary moulding portion of the front glass moulding.

FIG. 3 denotes one of two auxiliary moulding portions which form the first embodiment of the front glass moulding in cooperation with the above-mentioned main moulding portion. Since the two auxiliary moulding portions are identical with each other, only one of the auxiliary moulding portions will be described, with the understanding that the same description is applicable to the other auxiliary moulding portion. The auxiliary moulding portion is in the form of an elongated strip formed by extruding a suitable synthetic resin and is shown by reference numeral 20. The inner surface of the auxiliary moulding portion 20 is inwardly curved to provide a rainwater guide groove 21 and the outer surface of the auxiliary moulding portion 20 is formed with a plurality of longitudinally spaced projections 22 to be fitted into the through holes 18 in the leg 13 of the associated moulding side section 11b. The under surface 23 of the auxiliary moulding portion 20 is stepped to provide a shoulder 24 at the rear side edge, adapted to seat on the shoulder or engaging means 15 on the leg 13 in the associated moulding side section 11b.

Each auxiliary moulding portion 20 is positioned within the associated side section 11b by inserting the projections 22 on the auxiliary moulding portion 20 into the corresponding through holes 18 in the leg 13 of the side section 11b, whereupon the shoulder 24 on the auxiliary moulding portion 20 seats on the shoulder 15 to complete the front glass moulding.

Figure 4:
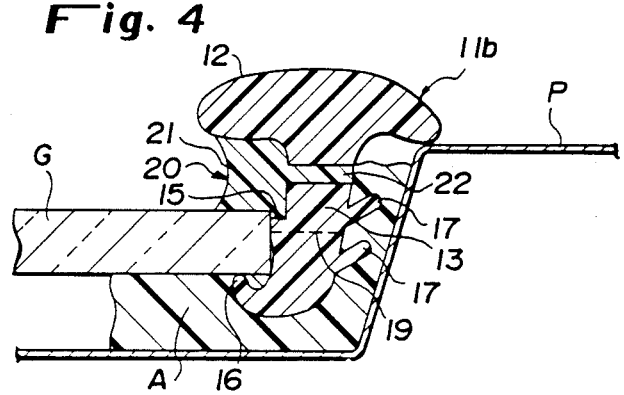
FIG. 4 is a cross-sectional view on an enlarged scale taken substantially along line A—A of FIG. 1.
Figure 5:
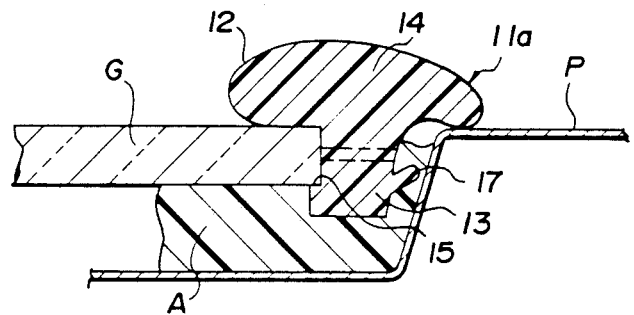
FIG. 5 is a cross-sectional view on an enlarged scale taken substantially along line B—B of FIG. 2.

In the thus assembled front glass moulding, the under surface of the head 12 and the upper surface of the upper shoulder 15 in the central section 11a define a groove for receiving the upper or leading side edge of the front glass pane G of the vehicle V, as seen in FIG. 4. The surface of the shoulder or engaging means 15 and the upper side edge of the lower shoulder or engaging means 16 define a groove for receiving the side edge of the associated front glass pane G, as seen in FIG. 5. The inwardly curved inner face of the auxiliary moulding portion 20 associated with each side section 11b serves as a rainwater guide. In addition, the front glass moulding of the present invention eliminates the requirement of corner joints between the central section 11a and side sections 11b, and presents a very aesthetic external appearance. And since the one, or the inner, surface of the leg 13 of each side section 11b is formed with a rainwater guide groove in an upper portion thereof and a glass receiving groove in a lower portion thereof, the upper edge of the front glass pane G can be held in position in a stabilized condition in the central section 11a. By merely fitting the auxiliary moulding portion into the associated side moulding section 11b by a selected or desired degree, the depth of the rainwater guide can be selectively varied and the under surface of the auxiliary moulding portion can positively hold the side edge of the front glass pane G. Furthermore, by inserting the projections 22 on the auxiliary moulding portion 20 into the through holes 18 in the leg 13 of the associated side section 11a, the main moulding portion and the auxiliary moulding portion are connected.

As is clear from the foregoing description of the first embodiment of the front glass moulding according to the present invention, the moulding requires only two different types of parts, that is, the main moulding portion and the auxiliary moulding portions. This differs from the prior art front glass moulding, which requires three different types of parts, that is, a central moulding portion, side moulding portions and corner joints connecting the central and side moulding portions. Thus, the front glass moulding can be simply and easily assembled at less expense. The main moulding portion concurrently serves to hold the front glass pane and guide rainwater. The auxiliary moulding portions which serve to firmly pinch the front glass pane and adjust the depth of the rainwater guide grooves. The glass pane can thereby be positively held in position, and rainwater in varying amounts can be handled.

The front glass pane G is inserted into the thus formed front glass moulding by sliding the glass pane along the inner surfaces of the legs 13 of the side moulding sections 11b until the leading side edge of the glass pane abuts against the inner surface of the leg 13 of the central moulding section 11a. The projections 22 on the auxiliary moulding portions 20 are then adjustably inserted into the through holes 18 in the legs 13 of the side moulding sections 11b to hold the glass pane G against the lower shoulders or engaging means 16 on the legs 13. Thereafter, adhesive A is filled in the space left between the panel P, the front glass moulding and the glass pane G to firmly secure them together as shown in FIGS. 4 and 5.

Figure 6:
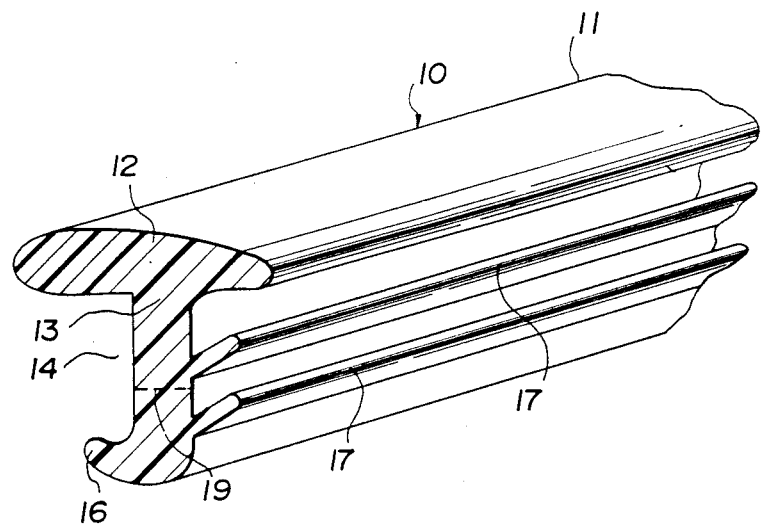
FIG. 6 is a fragmentary perspective view of a preform of a second embodiment of the front glass moulding of the present invention.

Now referring to FIGS. 6 to 9 inclusive, wherein, a second embodiment of the front glass moulding of the present invention is illustrated, FIG. 6 shows a section of the preform for the second embodiment of the front glass moulding. The preform is generally shown by reference numeral 10, and comprises a body 11 integrally moulded by extruding a suitable synthetic resin. The body 11 is in the form of an elongated strip of a selected length and has a wide head 12 adapted to be exposed and a leg 13 extending downwardly from the head at substantially right angles thereto and adapted to be positioned within the panel P of the vehicle V. One, or the inner, surface of the leg 13 is inwardly bent in a curve at the lower end thereof to provide a shoulder or engaging means 16 to define a recess 14 for the purpose to be described hereinafter. The other, or outer, surface of the leg 13 is provided with at least one retention projection 17 (two vertically spaced projections 17 are in the illustrated embodiment).

The body 11 is bent into a substantially U-shaped configuration to provide a central section 11a and two side sections 11b extending from the opposite ends of the central section 11a at substantially right angles to the central section 11a. The leg 13 in the central section 11a is cut along the cutting line 19 to remove the portion of the leg 13 positioned below the upper projection 17. According to the present invention, the body 11 may be formed without the portion of the leg 13 in the central section 11a positioned below the upper projection 17 in the second embodiment of the front glass moulding within the scope of the present invention. Alternatively, the portion of the leg 13 positioned below the upper projection 17 on the leg 13 in the section of the body where the central section 11a is expected to be formed is previously cut away prior to the bending of the body 11. In either of these ways, can the main moulding portion for the third embodiment of the front glass moulding be formed.

Figure 7:
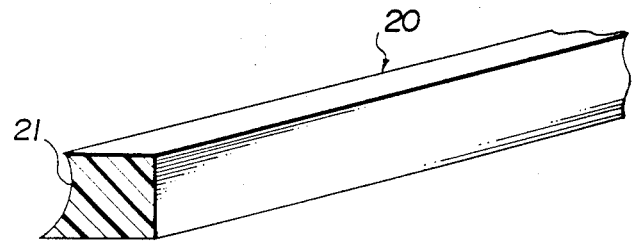
FIG. 7 is a perspective view of an auxiliary moulding portion of the second embodiment of the front glass moulding of the invention.
Figure 8:
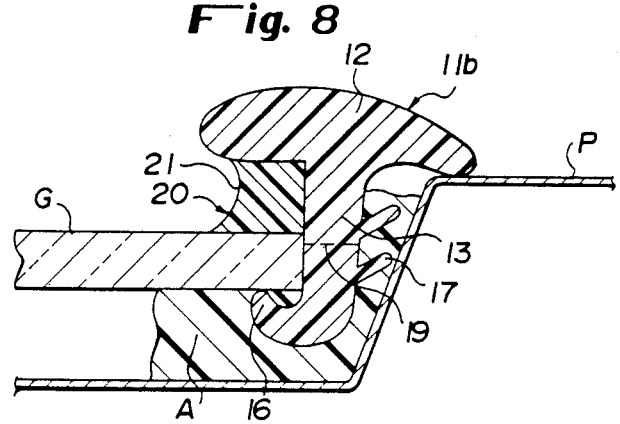
FIG. 8 is a cross-sectional view taken substantially along line A—A of FIG. 1.
Figure 9:
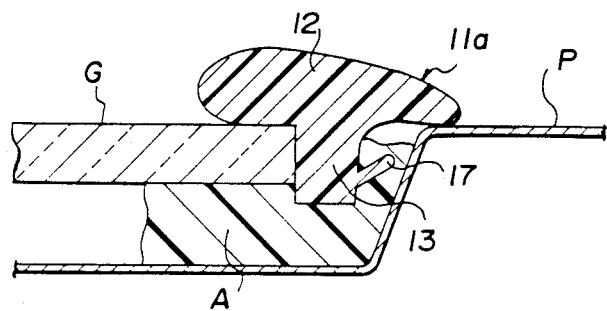
FIG. 9 is a cross-sectional view taken substantially along line B—B of FIG. 1.

FIG. 7 shows one of the auxiliary moulding portions which form the second embodiment of the front glass moulding of the invention in cooperation with the main moulding portion. Since the two auxiliary moulding portions are identical with each other, only one of the auxiliary moulding portions will be described, with the understanding that the same description will be applicable to the other auxiliary moulding portion. The auxiliary moulding portion is in the form of an elongated strip formed by extruding a suitable synthetic resin, and is shown by reference numeral 20. The inner surface of the auxiliary moulding portion 20 is inwardly curved to provide a rainwater guide groove 21, and the under surface 23 of the auxiliary moulding portion 20 is formed flat. The flat under surface 23 of the auxiliary moulding portion 20 is adapted to pinch the adjacent side edge of the front glass pane G in cooperation with the shoulder or engaging means 16 on the leg 13 on the associated moulding side portion 11b to positively hold the glass pane G in position. The front glass pane G is inserted into the front glass moulding by sliding the opposite side edges of the pane along the inner surfaces of the legs 13 of the side sections 11b until the leading side edge of the pane G abuts against the inner surface of the leg 13 of the central section 11a. The auxiliary moulding portions 20 are then inserted into the spaces defined by the under surfaces of the heads 12 of the side sections 11b and the upper surface of the glass pane G to firmly press the glass pane G against the shoulders or engaging means 16 on the legs 13 of the side sections 11b to thereby hold the glass pane in position.

The operative effects provided by the second embodiment of the front glass moulding according to the present invention are substantially similar to those described in connection with the first embodiment hereinabove. However, according to the second embodiment of the front glass moulding, the depth and height of the rainwater guide grooves can be varied by suitably modifying the dimensions of the auxiliary moulding portions 20 so that the second embodiment can be suitably applied to various types of vehicles.

Figure 10:
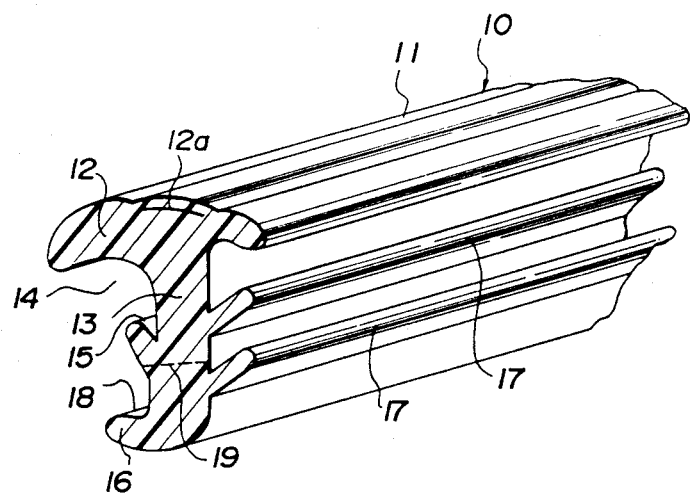
FIG. 10 is a fragmentary perspective view of a preform of a third embodiment of the front glass moulding according to the present invention.
Figure 11:
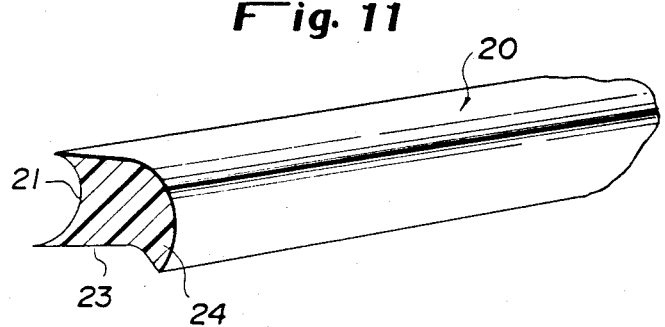
FIG. 11 is a perspective view of an auxiliary moulding portion of the third embodiment of the front glass moulding.
Figure 12:
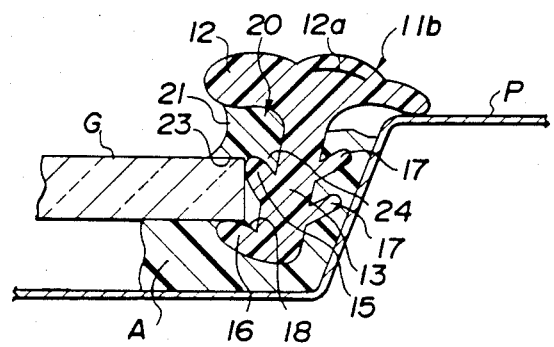
FIG. 12 is a cross-sectional view taken substantially along line A—A of FIG. 1.
Figure 13:
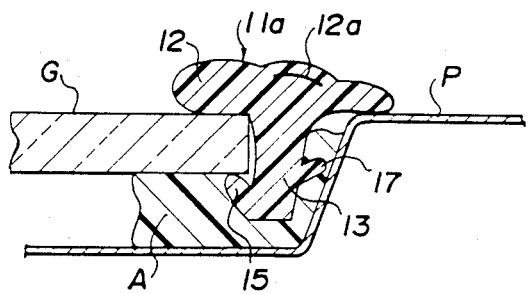
FIG. 13 is a cross-sectional view taken substantially along line B—B of FIG. 1.

Now, referring to FIGS. 10 to 13, wherein the third embodiment of the front glass moulding of the present invention is illustrated, FIG. 10 shows a section of the preform for the third embodiment. The preform is generally shown by reference numeral 10 and comprises a body 11 integrally moulded by extruding a suitable synthetic resin. The body 11 is in the form of an elongated strip of a selected length and has a wide head 12 and a leg 13 extending downwardly from the head 12 at right angles thereto. One, or the inner, surface of the leg 13 is provided, in a position below the head 12, with a recess 14 to define a shoulder or engaging means 15. The lower end of the leg 13 is inwardly bent in a curve to define a second engaging means 16, which defines a groove 18 in cooperation with the first-mentioned projection or engaging means 15. The other, or outer, surface of the leg 13 is provided with at least one retention projection 17 (two vertically spaced projections 17 are shown in the illustrated embodiment). In FIGS. 10, 12, and 13, reference numeral 12denotes an ornamental polyester tape embedded in the head 12. Reference numeral 19 denotes a cutting line along which the leg 13, in a portion of the body 11, is cut to remove the portion of the leg positioned below the projection 15, as described in connection with the foregoing embodiments. The body 11 is bent into a substantially U-shaped configuration under heating to provide a central section 11a and two side sections 11b extending from the opposite ends of the central section at substantially right angles thereto. The leg 13 in the central section 11a is cut along the cutting line 19 to remove the portion of the leg 13 of the central section 11a positioned below the cutting line 19. According to the present invention, it is also contemplated that the leg 13 in the portion of the body 11 which is expected to form the central section may be previously cut along the cutting line 19 to remove the portion positioned below the projection 15 before the body 11 is bent. In either way can the main moulding portion of the third embodiment of the front glass moulding be formed.

FIG. 11 shows one of two auxiliary moulding portions 20 which form the third embodiment of the front glass moulding in cooperation with the main moulding portion as shown in FIGS. 12 and 13. The auxiliary moulding portion 20 of FIG. 11 is in the form of an elongated strip formed by extruding a suitable synthetic resin. The inner surface of the auxiliary moulding portion 20 is inwardly curved to provide a rainwater guide groove 21 when positioned in the associated side moulding section 11b as will be described hereinafter. The under surface of the auxiliary moulding portion 20 is substantially flat, but is provided at the rear or outer side edge with an acute downwardly extending projection 24.

A front glass pane G is received into the main moulding portion in the same manner as described in connection with the foregoing embodiments and the auxiliary moulding portions 11b are placed into the side sections 11b in the manner as described in connection with the foregoing embodiments, whereby the glass pane G is firmly pinched between the projection or engaging means 15 and the under surface of the head 12 in the central section 11a and between the projections 15 and 16 in the side sections 11b. In the acute rear edges 24 of the auxiliary moulding portions 20 snugly fit the projections or engaging means 15 on the legs 13 of the side sections 11b, the glass pane G can be more positively held in position. Further, the ornamental polyester tape 12a embedded in the exposed head 12 gives an aesthetic external appearance to the front glass moulding. The third embodiment is mounted in the panel P of the vehicle V in the same manner as described in connection with the first embodiment.

While preferred embodiments of the invention have been shown and described in detail, it will be understood that the same are for illustration purpose only and not to be taken as a definition of the invention, reference being had for this purpose to the appended claims.

What is claimed is:

1. A moulding for the front glass pane of a vehicle comprising:

a substantially inverted U-shaped synthetic resin main moulding body, including a central section forming the bottom of the U-shape and side sections forming the sides of the U-shape and defining an interior portion therebetween, said side sections extending substantially right angles to said central section, wherein each said section comprises a head portion and a leg portion extending from said head portion at substantially right angles thereto; and a synthetic resin auxiliary moulding body on each said side section of said main moulding body extending between said head portion of said side section and said front glass pane and engaging said front glass pane;

wherein said head portion of said central section comprises means defining a recess receiving the front glass pane, said leg portion of each said side section comprises at least one engaging means engaging said front glass pane, and each said auxiliary moulding body has a free and uncovered concave curved surface facing said interior portion of said substantially U-shaped synthetic resin main moulding body.

2. A moulding for the front glass of a vehicle comprising:

a substantially inverted U-shaped synthetic resin main moulding body, including a central section forming the bottom of the U-shape and side sections forming the sides of the U-shape and defining an interior portion therebetween, said side sections extending at substantially right angles to said central section, wherein each said section comprises a head portion and a leg portion extending from said head portion at substantially right angles thereto; and a rain guide for each said side section of said main moulding body, each said rain guide comprising a synthetic resin auxiliary moulding body , wherein each said head portion and each said leg portion of said side sections have a recess therebetween facing said interior portion of said substantially U-shaped main moulding body for receiving a respective said rain guide therein;

said head portion and said leg portion of said central section have a recess therebetween receiving said front glass pane; and wherein each said leg portion of said side sections comprises means receiving and engaging said front glass pane.

3. The moulding as set forth in claim 2, wherein:
there are two and only two said rain guides.

4. The moulding as set forth in claim 3, wherein:
said central section is integral and one piece with said side sections of said main moulding body.

5. The moulding as set forth in claim 2, wherein:
said central section is integral and one piece with said side sections of said main moulding body.

6. The moulding as set forth in claim 2, wherein:
said leg portion of said central section is shorter, in a direction substantially perpendicular to said head portion, than said leg portion of said side sections.

7. The moulding as set forth in claim 2, wherein:
each of said legs of said side sections has a plurality of through holes therein across the width of said leg; and each of said rain guides has a plurality of projections thereon corresponding to and for reception in said through holes of said leg of a respective said side section.

8. A moulding for the front glass of a vehicle comprising:

a substantially inverted U-shaped synthetic resin main moulding body, including a central section forming the bottom of the U-shape and side sections forming the sides of the U-shape and defining an interior portion therebetween, said side sections extending at substantially right angles to said central section, wherein each said section comprises a head portion and a leg portion extending from said head portion at substantially right angles thereto; and a rain guide on each said side section of said main moulding body, each said rain guide comprising a synthetic resin auxiliary moulding body on each said side section of said main moulding body extending between said head portion of said side section and said front glass pane and engaging said front glass pane, wherein each said head portion and each said leg portion of said side sections have a recess therebetween facing said interior portion of said substantially U-shaped main moulding body for receiving a respective said rain guide therein;

said head portion and said leg portion of said central section have a recess therebetween receiving said front glass pane;

wherein each said leg portion of said side sections comprises means receiving and engaging said front glass pane; and each said rain guide has a lower surface facing a respective said receiving and engaging means, wherein said front glass pane is received and engaged between said rain guide and said receiving and engaging means.

9. The moulding as set forth in claim 8, wherein:
each said leg portion has a second engaging means thereon for engaging said front glass pane, said rain guide being supported by said second engaging means.

10. The moulding as set forth in claim 9, wherein:
each said second engaging means is a shoulder on a respective said leg portion, and each said rain guide has a corresponding shoulder supported by said shoulder of said leg portion.

11. The moulding as set forth in claim 9, wherein:
each said second engaging means is a projection on a respective said leg portion, and each said rain guide has a corresponding projection supported by said projection of said leg portion.

* * * * *